(12) United States Patent
Marriott

(10) Patent No.: US 8,020,894 B2
(45) Date of Patent: Sep. 20, 2011

(54) SEAT BELT SYSTEM

(75) Inventor: Brandon Scott Marriott, Waterford, MI (US)

(73) Assignee: TK Holdings Inc., Auburn Hills, MI (US)

( * ) Notice: Subject to any disclaimer, the term of this patent is extended or adjusted under 35 U.S.C. 154(b) by 81 days.

(21) Appl. No.: 12/453,246

(22) Filed: May 4, 2009

(65) Prior Publication Data

US 2009/0273172 A1 Nov. 5, 2009

Related U.S. Application Data

(60) Provisional application No. 61/071,549, filed on May 5, 2008.

(51) Int. Cl.
*B60R 22/00* (2006.01)
(52) U.S. Cl. .................................................. 280/801.1
(58) Field of Classification Search ............... 280/801.1, 280/806, 808; 180/268; 24/603, 633, 645, 24/664
See application file for complete search history.

(56) References Cited

U.S. PATENT DOCUMENTS

| 3,729,059 | A | 4/1973 | Redmond |
| 4,432,119 | A | 2/1984 | Schwark et al. |
| 5,182,836 | A | 2/1993 | Burkat |
| 5,274,890 | A | 1/1994 | Shimizu et al. |
| 5,375,304 | A | 12/1994 | Miyauchi et al. |
| 7,178,208 | B2 * | 2/2007 | Bentsen et al. .................. 24/303 |
| 7,797,803 | B2 * | 9/2010 | Falb et al. ........................ 24/633 |
| 2007/0271746 | A1 * | 11/2007 | Midorikawa et al. ........... 24/633 |

* cited by examiner

*Primary Examiner* — Faye M. Fleming
(74) *Attorney, Agent, or Firm* — Foley & Lardner LLP

(57) ABSTRACT

A vehicle occupant restraint system includes a seat belt webbing connected to a latch plate, wherein the latch plate is configured to be releasably connected to a buckle assembly in order to secure the webbing in a position capable of restraining the occupant. The buckle assembly includes a release button, a blocking component, a solenoid coupled to a connecting member positioned to engage the blocking component, and a solenoid actuator electrically connected to the solenoid. The blocking component is configured to engage the latch plate in order to connect the latch plate to the buckle assembly, and is configured to disengage from the latch plate in order to facilitate the release of the latch plate when the release button is depressed. When the solenoid actuator actuates the solenoid, the connecting member is configured to move to thereby change the position of the blocking component in order disengage the blocking component from the latch plate.

11 Claims, 8 Drawing Sheets

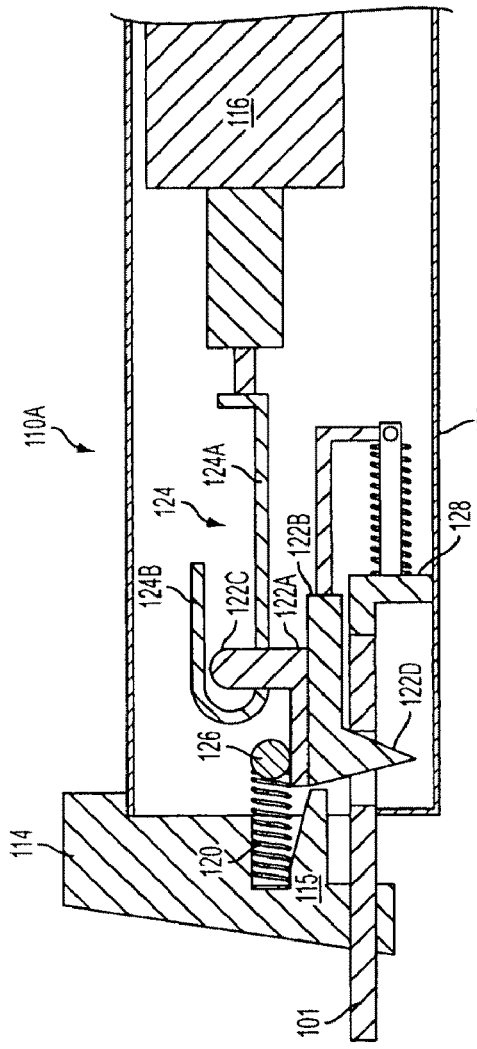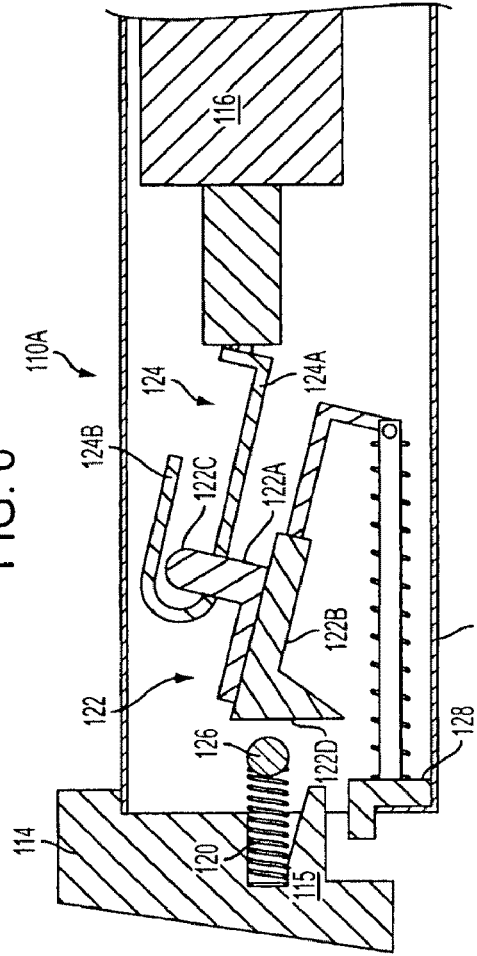

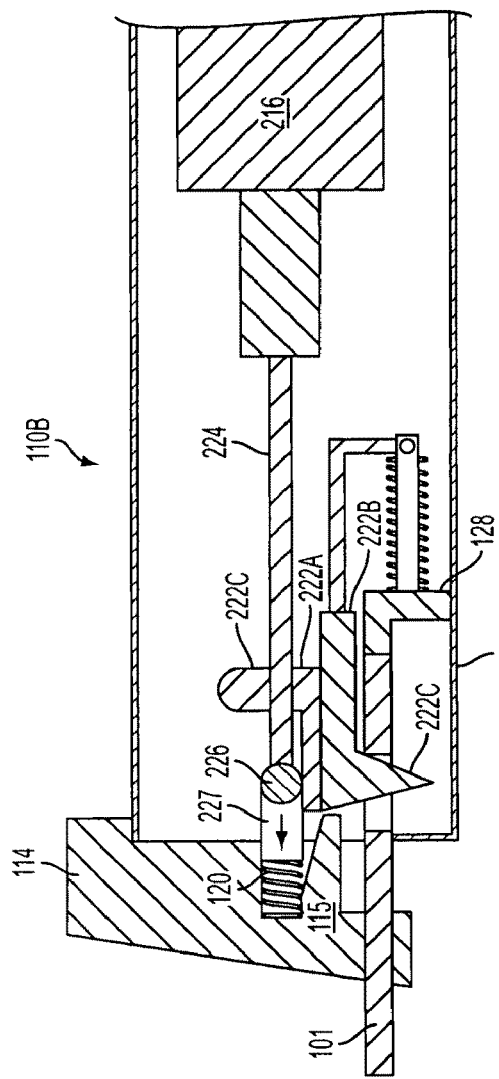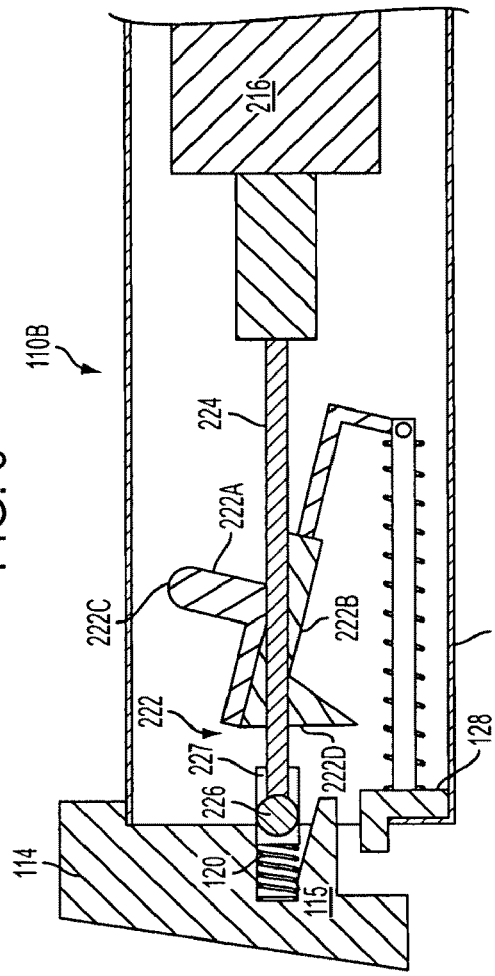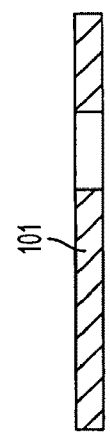

SEAT BELT SYSTEM

CROSS-REFERENCE TO RELATED PATENT APPLICATION

This application claims priority to and the benefit of U.S. Provisional Patent Application No. 61/071,549, filed May 5, 2008. The foregoing provisional application is incorporated herein by reference in its entirety.

BACKGROUND

This application relates generally to the field of vehicle occupant restraint systems. More particularly, this application relates to a seat belt system having a latch plate and buckle assembly configured to remotely release the latch plate while maintaining mechanical functionality for normal use.

Conventional seat belt systems for vehicles typically include a matable latch plate and buckle assembly configured to secure the vehicle occupant to a seat during rapid acceleration and deceleration of the vehicle. These systems may be found in front seats, rear seats, third seats, etc., or any combination thereof.

In the event of an emergency vehicle situation (such as a sudden stop, collision, rapid change of altitude, etc.) it may become necessary to release a seat belt from the buckle assembly remotely by a vehicle operator, other vehicle occupant, emergency personnel, etc., to facilitate the quick exit of occupants, especially those occupants who may require assistance with their seat belt. For example, in school buses, it may be difficult for a bus driver to both unbuckle all of the children in a bus and help them exit safely in an emergency.

Therefore, it is desirable for a seat belt system to include a remote latch release for use in the event of an emergency situation. The buckle assembly should maintain full mechanical functionality for use in all other situations or in the event of power failure.

It is also desirable that any additional components required to achieve the remote release functionality of the buckle assembly be integrated into the buckle in order to avoid creating a bulky mass that could result in occupant injury upon release.

It is also desirable that the additional components required to achieve the remote functionality of the buckle assembly be sized to allow the buckle assembly to be packaged in nearly all environments that currently use standard buckles.

It is also desirable that the system for remote release of the buckle remain generally deenergized when not in use in order to reduce heat generation during normal use of the buckle assembly.

SUMMARY

A vehicle occupant restraint system includes a seat belt webbing connected to a latch plate, wherein the latch plate is configured to be releasably connected to a buckle assembly in order to secure the webbing in a position capable of restraining the occupant. The buckle assembly includes a release button, a blocking component, a solenoid coupled to a connecting member positioned to engage the blocking component, and a solenoid actuator electrically connected to the solenoid. The blocking component is configured to engage the latch plate in order to connect the latch plate to the buckle assembly, and is configured to disengage from the latch plate in order to facilitate the release of the latch plate when the release button is depressed. When the solenoid actuator actuates the solenoid, the connecting member is configured to move to thereby change the position of the blocking component in order disengage the blocking component from the latch plate.

A motor vehicle having an occupant restraint system includes a plurality of seats, wherein the seats are configured to support seat occupants. A seat belt assembly is attached to at least one of the plurality of seats, wherein the seat belt assembly is configured to restrain the occupant. The seat belt assembly includes a seat belt webbing connected to a latch plate and a buckle assembly, wherein the latch plate may be configured to be releasably connected to a buckle assembly. The buckle assembly may be configured to include a release button, a blocking component, a solenoid coupled to a connecting member positioned to engage the blocking component, and a solenoid actuator electrically connected to the solenoid. The blocking component may be configured to engage the latch plate in order to connect the latch plate to the buckle assembly, and is configured to disengage from the latch plate in order to facilitate the release of the latch plate when the release button is depressed. When the solenoid actuator actuates the solenoid, the connecting member is configured to move to thereby change the position of the blocking component in order disengage the blocking component from the latch plate.

BRIEF DESCRIPTION OF THE FIGURES

The accompanying drawings, which are incorporated in and constitute a part of this specification, illustrate preferred embodiments of the invention and together with the description serve to explain principles of the invention.

FIG. 6 is a side cross-sectional view of a buckle assembly according to a first embodiment of the invention in which the solenoid is deenergized.

FIG. 7 is a side cross-sectional view of a buckle assembly according to a first embodiment of the invention in which the solenoid is energized.

FIG. 9 is a side cross-sectional view of a buckle assembly according to a second embodiment of the invention in which the solenoid is deenergized.

FIG. 10 is a side-cross sectional view of a buckle assembly according to a second embodiment of the invention in which the solenoid is energized.

DETAILED DESCRIPTION

Figure 1:
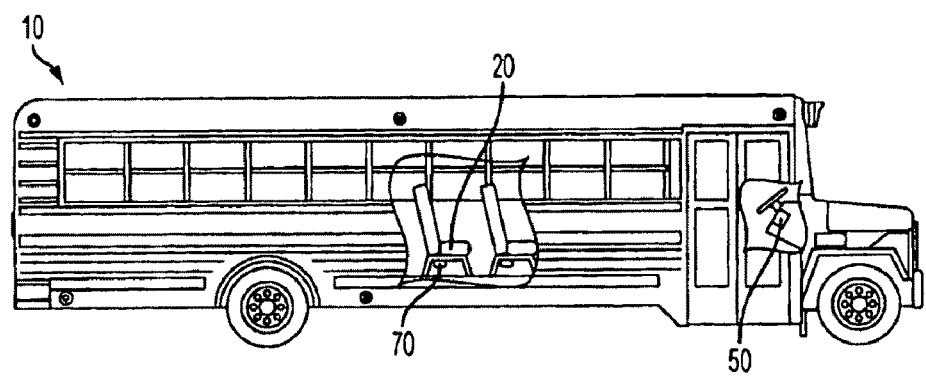
FIG. 1 is a side view of an exemplary vehicle including a seat with a seat belt system according to an embodiment of the invention.

Referring generally to the FIGURES and specifically to FIGS. 1-4, a seat belt system is configured to allow a seat belt latch plate 101 to be remotely released from a buckle assembly 110 through an electrical signal while maintaining full mechanical functionality for normal use or in the event of power failure. The seat belt system can be used in any vehicle 10 which may have vehicle occupant seats 20 configured to include seat belts. The seat belt system includes a seat belt webbing 90 connected to a latch plate 101 and a buckle assembly 110 for securing the latch plate 101. The buckle assembly 110 utilizes a blocking mechanism to secure the latch plate 101 when it is inserted into the buckle assembly 110. The blocking mechanism can be any combination of buckle assembly components which releasably secure the latch plate 101 in the buckle assembly 110. A vehicle occupant may then release the latch plate 101 from the buckle assembly 110 by utilizing the mechanical release mechanism or the remote release mechanism. The mechanical release mechanism utilizes a release button 114 in the buckle assembly 110. The release button 114 alters the blocking mechanism so that the latch plate 101 is released from the buckle assembly 110. The remote release mechanism utilizes an actuator switch 50 which may send an electrical signal to a solenoid in the buckle assembly 110. The solenoid does not directly act on an ejector spring in the buckle assembly, but rather on one of the components of the blocking mechanism. Because the solenoid acts on the blocking mechanism, it is not directly in the load path for the forces placed on the seat belt during a crash. The seat belt loads never travel through the solenoid or other remote release mechanism components, which greatly improves the robustness of the seat belt assembly. The solenoid is configured to alter the blocking mechanism in a way so that the latch plate is released from the buckle assembly 110. The solenoid is also configured so as not to interfere with the mechanical release mechanism.

Figure 5:
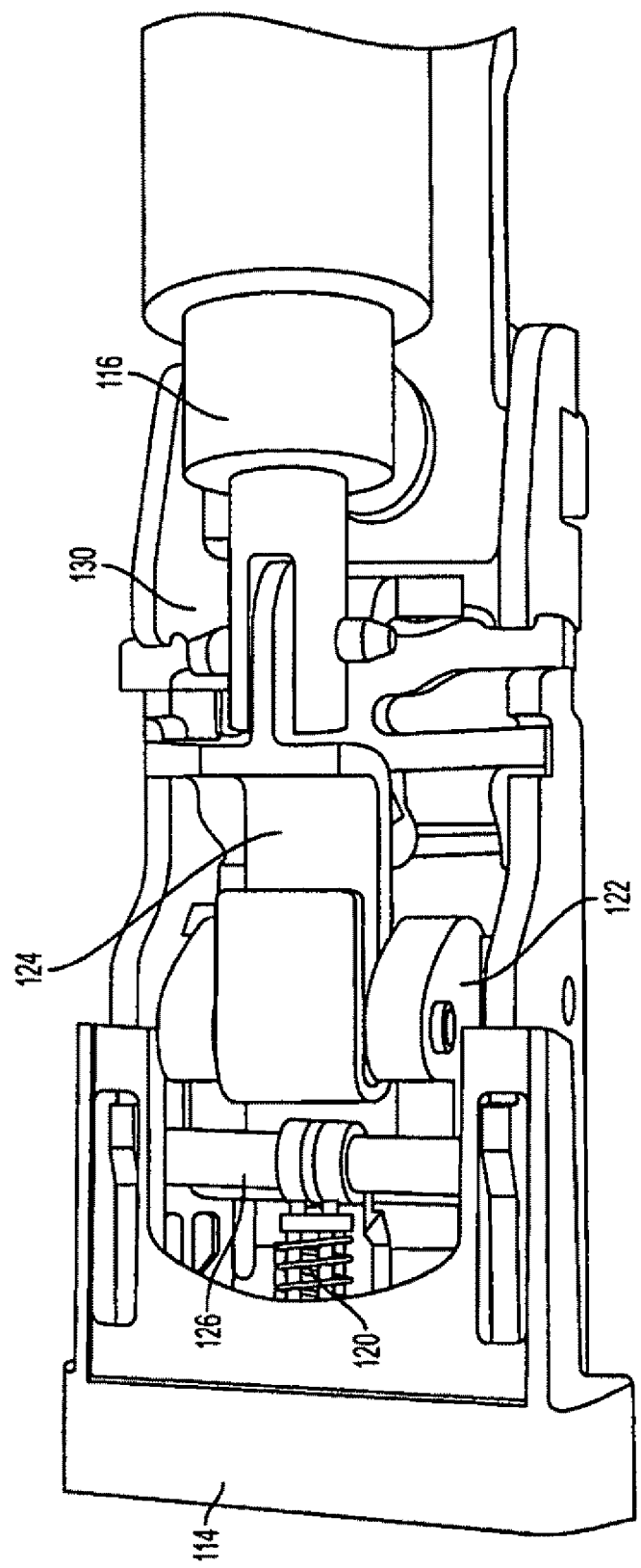
FIG. 5 is a top perspective view of a buckle assembly according to a first embodiment of the invention.

As shown in FIGS. 5-7, the blocking mechanism comprises a lock bar 126 and a slider/latch bar 122. The lock bar 126 may be located towards the top and the front of the buckle assembly 110A, above where the latch plate 101 enters the buckle assembly 110A. The lock bar 126 is preferably a metal cylindrically-shaped bar which connects opposing sides of two sides of a buckle frame 130. The lock bar 126 in FIGS. 5-7 is configured to remain static during the entry and release (mechanical or remote) of the latch plate from the buckle assembly 110A.

The slider/latch bar 122 is located underneath the lock bar 126 and proximal to the release button protrusion 115 of the release button 114. The slider/latch bar 122 has a slider portion 122A and a latch bar portion 122B. The slider portion 122A is slidably attached to the top of the latch bar portion 122B such that they form one blocking component. The slider portion 122A is configured to slide across the top of the latch bar portion 122B when the release button 114 acts on it. The slider portion 122A is designed so that it may be wedged underneath the lock bar 126. The slider portion 122A has an upward extension 122C at its rear. As shown in FIGS. 5-7, the upward extension 122C of the slider portion 122A includes a slot for receiving a portion of the connecting member 124. The latch bar portion 122B has a downward extension 122D at its front. As shown in FIGS. 6-7, this downward extension 122D of the latch bar portion 122B is configured to mate with the latch plate 101 when the blocking mechanism 122 is pivoted downward by the insertion of the latch plate 101.

As shown in FIGS. 5-7, the release button 114 may be located above where the latch plate 101 enters the buckle assembly 110A. The release button 114 is roughly rectangular shaped and includes a release button protrusion 115. The release button protrusion 115 is located at the rear of the release button 114. When the release button 114 is depressed, the release button 114 slides along the buckle frame 130 and the release button protrusion 115 is configured to alter a blocking mechanism component. As shown in FIGS. 5-7, the release button protrusion 115 is configured to contact and move the slider portion 122A of the slider/latch bar 122. The release button 114 is connected to a button spring and guide bar 120 which connects the release button 114 to a blocking mechanism component. As shown in FIGS. 5-7, the button spring and guide bar 120 connect the release button 114 to the lock bar 126. When the release button 114 is depressed, the button spring and guide bar 120 force the release button 114 back to its original position.

Figure 8:
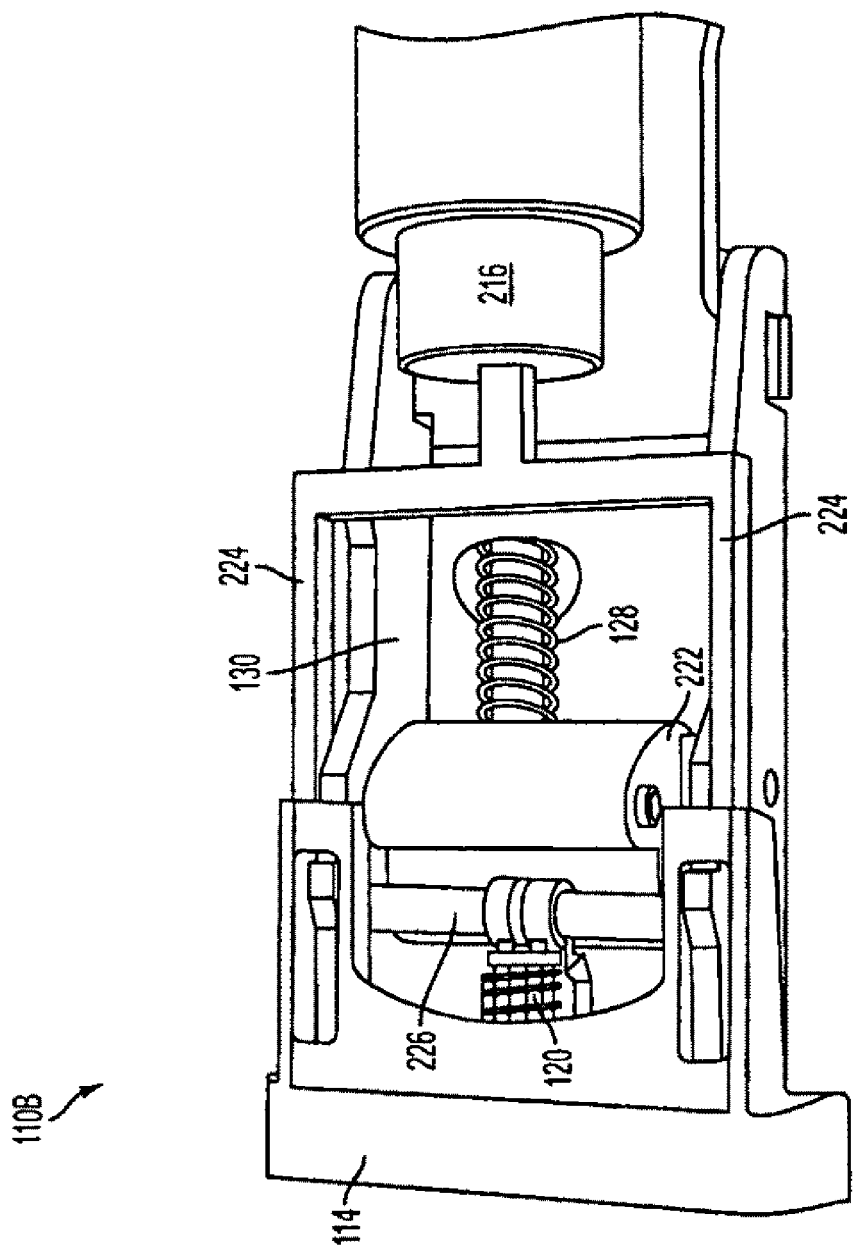
FIG. 8 is a top perspective view of a buckle assembly according to a second embodiment of the invention.

The solenoid preferably comprises an iron core and a plunger proximally located to the core. The iron core is preferably encircled with a casing containing electrically-conductive wiring. The solenoid is configured to receive an electrical signal when the actuator switch 50 is actuated. The solenoid is preferably deenegerized until it receives the electrical signal in order to minimize heat generation. When the solenoid receives the electrical signal, electrical current runs through wiring of the solenoid, creating a magnetic field in the interior of the solenoid. The magnetic field then causes the solenoid plunger to be attracted to or repelled from the iron core, depending on the type of magnetic field created. Alternative types of solenoids may be employed. For example, when the plunger is attracted towards the core, the solenoid is a pull-type solenoid. A pull-type solenoid 116 is shown in FIGS. 5-7. When the plunger is repelled away from the core, the solenoid is a push-type solenoid. A push-type solenoid 216 is shown in FIGS. 8-10. The solenoid is preferably located at the rear of the buckle assembly 110. The plunger of the solenoid is coupled to a connecting member and acts on the connecting member when the solenoid is energized.

An example of a connecting member 124 is shown in buckle assembly 110A in FIGS. 5-7. The connecting member 124 is a component which connects a solenoid 116 to a blocking mechanism component. The connecting member 124 can be made of any durable material, such as plastic or metal. As shown in FIGS. 5-7, an extension portion on the rear of the connecting member 124 is coupled to the solenoid 116. The remaining portion of the connecting member 124 is generally J-shaped or U-shaped, having a flat portion 124A and a hook portion 124B. The flat portion 124A of the connecting member 124 is inserted into a slot in the upward extension 122C of the slider portion 122A. The hook portion 124B of the connecting member 124 then wraps around the uppermost point of the extension 122C of the slider portion 122A, and continues back towards the solenoid 116. The shape of the connecting member 124 and the coupling between the connecting member 124 and the slider portion 122A is important to allowing the buckle assembly to have both mechanical and remote release mechanisms. The slider/latch bar 122 can shift and pivot freely as needed when the mechanical release mechanism is utilized, while allowing the connecting member 124 to pull on the slider/latch bar 122 when the remote release mechanism is utilized.

Another exemplary connecting member 224 is shown in FIGS. 8-10. The rear of the connecting member 224 is coupled to a push-type solenoid 216. The connecting member 224 as shown in FIG. 8 is generally U-shaped, having two bracket portions which extend along the exterior of buckle frame 130. The connecting member 224 could also be placed in the buckle assembly 110B such that it is located above the other buckle assembly 110B components. The two bracket portions of the connecting member 224 are connected to opposite sides of the lock bar 226. Any one of the many fastening mechanisms well known to those skilled in the art may be used to couple the connecting member 224 to the solenoid 216 or to couple the connecting member 224 to the lock bar 226. The shape of the connecting member 224 and the coupling between the connecting member 224 and the lock bar 226 is important to allowing the buckle assembly to have both mechanical and remote release mechanisms. The connecting member 224 may push the lock bar 226 as needed when the solenoid 226 is energized during operation of the remote release mechanism, while allowing the lock bar 226 to remain static when the mechanical release mechanism is utilized.

The connecting member in the buckle assemblies 110 allows the buckle assemblies 110 to maintain the ability to be used in a traditional manner, with a spring loaded release button, even though the buckle assemblies 110 include a solenoid, thereby unaffecting normal buckle function. The connection between the solenoid and a component of the blocking mechanism ensures that the structural load path within the buckle is unaffected by the presence of the solenoid. The manual release mechanism can be used at any time, even simultaneously with the remote release mechanism, without interference from the remote release mechanism.

Figure 2:
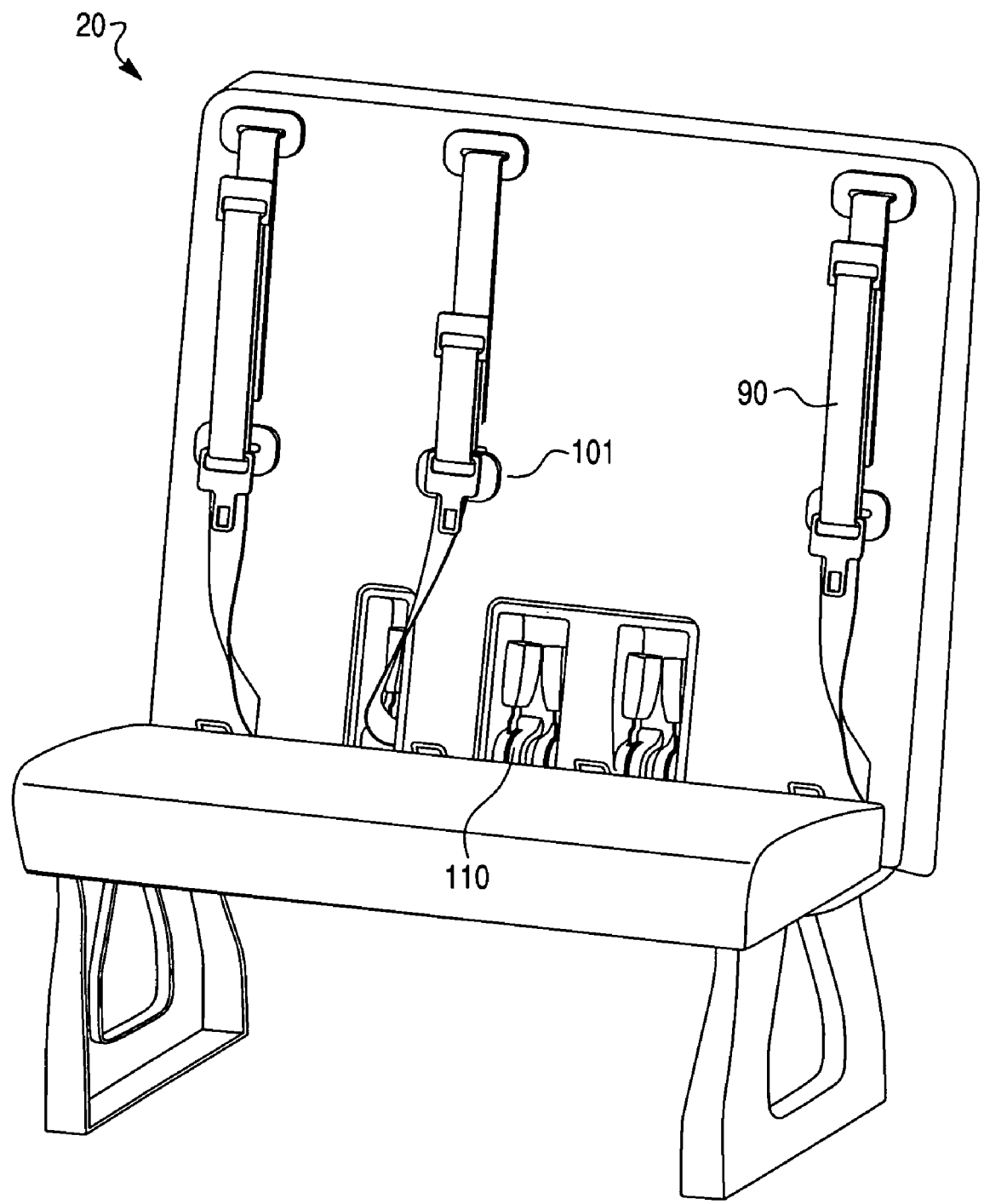
FIG. 2 is a perspective view of an exemplary vehicle seat including a seat belt system according to an embodiment of the invention.

As shown in FIGS. 1-2, a vehicle 10 may be equipped so that a passenger seat 20 is equipped with a seat belt system including buckle assemblies 110. The driver seat and/or all of the passenger seats may be equipped with seat belt systems including buckle assemblies 110. Thus, in case of an emergency, the latch plates 101 may be released from the buckle assemblies 110 remotely by the vehicle driver, e.g., to facilitate the quick exit of vehicle occupants. The remote release capability is especially useful for vehicle occupants who may otherwise need special assistance with unbuckling their seat belts. For example, it may be very difficult for a bus driver to both unbuckle all of the children in a school bus and help them exit safely in an emergency. Other potential vehicle applications include automobiles and mass-transit vehicles, such as motor coaches, buses, trains, airplanes, etc.

Figure 3:
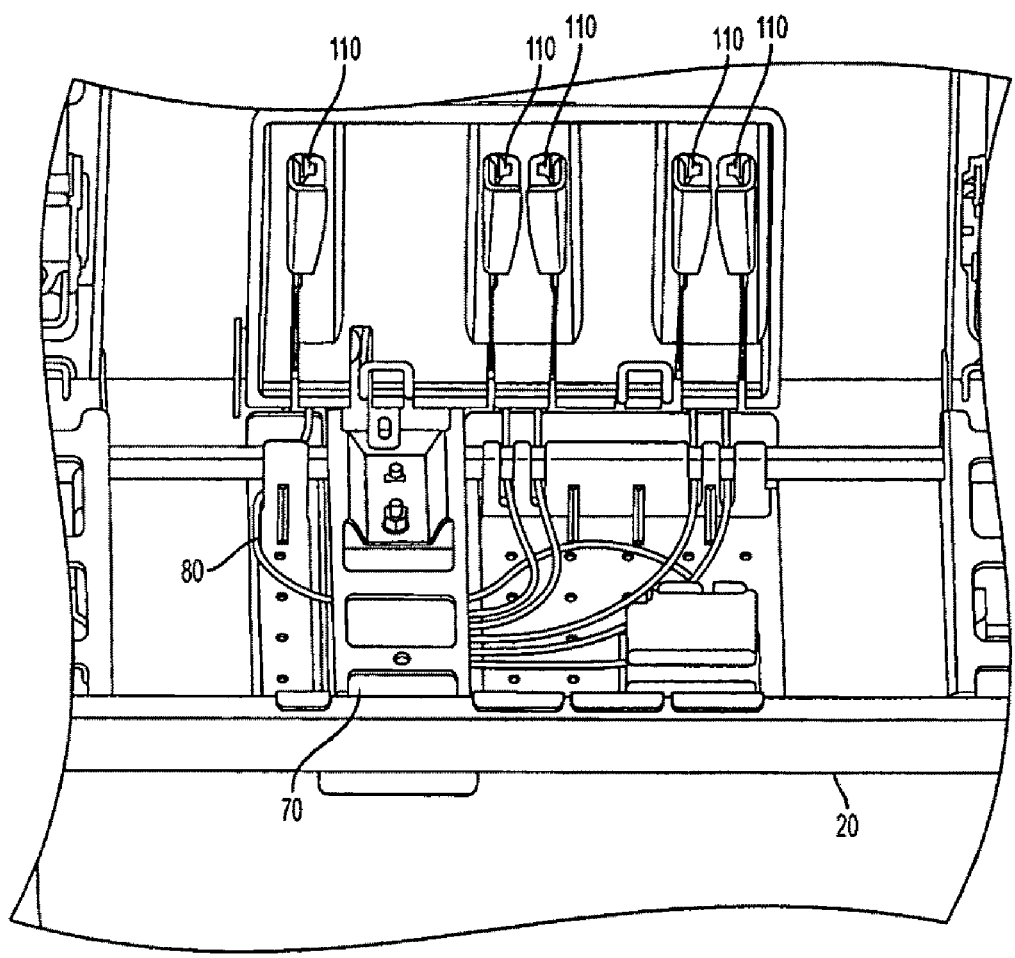
FIG. 3 is a perspective close-up view of a vehicle seat including a seat belt system according to an embodiment of the invention.
Figure 4:
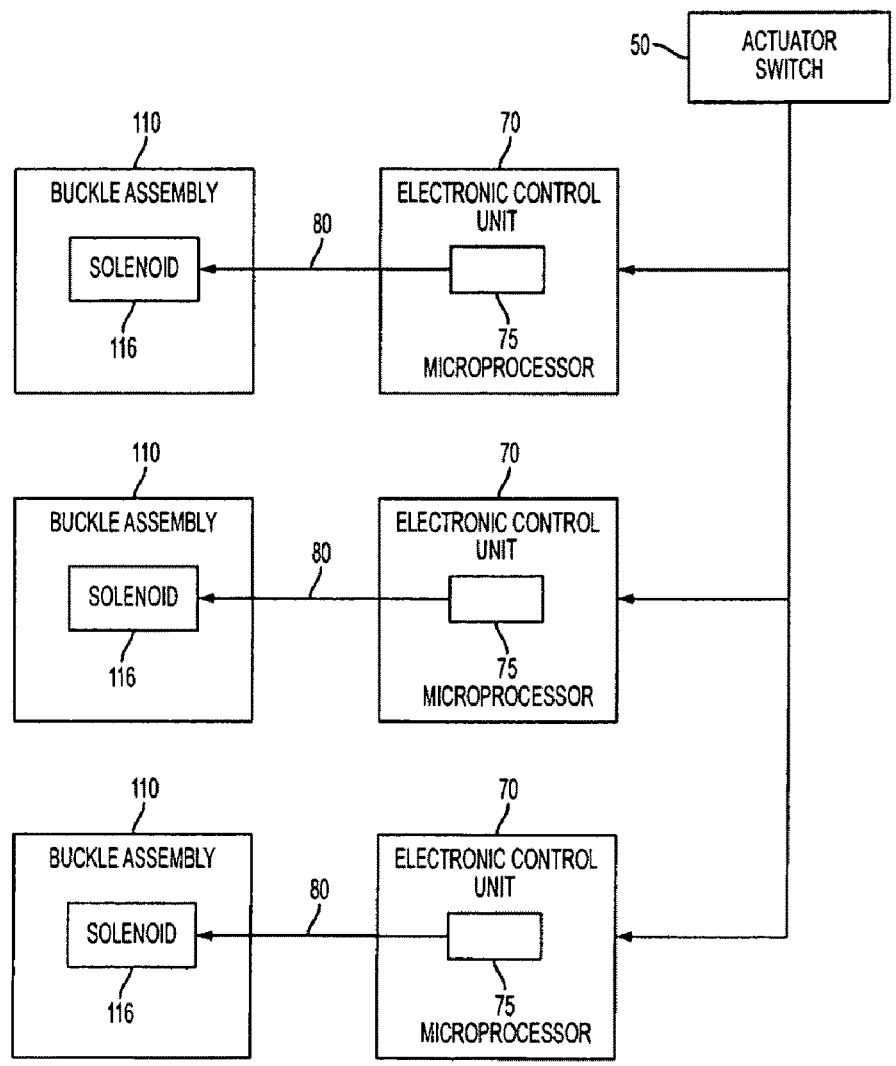
FIG. 4 is a schematic view of an exemplary electrical system for the seat belt system according to an embodiment of the invention.

As shown in FIGS. 3-4, the latch plate remote release mechanism may be controlled by an actuator switch 50, which may be located near the vehicle's driver's seating position (as shown in FIG. 1). The actuator switch 50 may provide for directly energizing a solenoid in the buckle assembly 110 (e.g., via a simple circuit closure), or provide an actuation signal to a electronic control unit 70 configured to receive an input from the actuator switch 50. There may be an electronic control unit 70 for each seat (in which case, the actuator switch 50 provides an actuation signal to each electronic control unit 70), or just one electronic control unit 70 for all seats. The electronic control unit 70 may contain a microprocessor 75 configured to send an appropriate signal to the solenoid 116 in the buckle assembly 110, as shown in FIG. 4. The electronic control unit 70 may be located on the seat 20 (as shown in FIG. 3) or any other suitable place in the vehicle. The microprocessor 75 may send a signal to another microprocessor, which may be located on seat 20 or in the buckle assembly 110. The signals transmitted in the system may be carried by any suitable method including, for example, through wires 80 (as shown in FIGS. 3-4) or wirelessly (e.g., "Bluetooth" communication). Wires 80 may utilize MAY-BUS communication, a simple current pulse, etc.

Referring to FIGS. 5-7, a first embodiment 110A of a buckle assembly is shown. When a latch plate 101 is inserted into the buckle assembly 110A, a blocking mechanism secures the latch plate. In FIGS. 5-7, a slider/latch bar 122 in conjunction with lock bar 126 performs this blocking mechanism function. When the latch plate 101 is inserted into the buckle assembly 110A, the slider/latch bar 122 rotates downwards towards the bottom of the buckle frame 130 and simultaneously shifts towards the release button 114. The downward extension 122D of the latch bar portion 122B is inserted into a slot of the latch plate 101 and contacts the bottom of the buckle frame 130 so as to secure the latch plate 101 in the buckle assembly 110A. The latch bar portion 122B is held in place because the slider portion 122A of the slider/latch bar 122 is wedged underneath the lock bar 126 when the slider/latch bar 122 rotates downwards.

Buckle assembly 110A includes a release button 114 that mechanically releases the latch plate from the buckle assembly 110 without use of or interference from the solenoid 116. When the release button 114 is depressed, protrusion 115 of release button 114 contacts the slider portion 122A and applies a force such that the slider portion 122A slides along the latch bar portion 122B in a direction away from the release button 114. The shift in position must be sufficient to translate the slider portion 122A past the edge of the lock bar 126. Once the slider portion 122A is no longer wedged underneath the lock bar 126, the slider/latch bar 122 rotates away from the bottom of the buckle frame 130 such that latch bar portion 122B no longer secures the latch plate 101 in the buckle assembly 110A. The movement and rotation of the slider/latch bar 122 causes an ejector spring 128 to eject the latch plate 101 out of the buckle assembly 110A.

Additionally, electrical release of the latch plate 101 from the buckle assembly 110A is possible using solenoid 116. In FIGS. 5-7, solenoid 116 is a pull-type solenoid. When the solenoid 116 is actuated, the plunger of solenoid 116 pulls on a connecting member 124 coupled to the solenoid 116 such that the connecting member 124 shifts away from the release button 114. When the connecting member 124 is pulled by the solenoid 116, the connecting member 124 pulls the slider portion 122A of the slider/latch bar 122, allowing the slider portion 122A to become unwedged from the lock bar 126. The slider/latch bar 122 then rotates upwards away from the bottom of the buckle frame 130. This movement of the slider/latch bar 122 causes the downward protrusion 122D of the latch bar portion 122B to release the latch plate 101 such that the latch plate 101 may be ejected from the buckle assembly 110A by ejector 128.

FIG. 6 illustrates the first embodiment 1110A of the buckle assembly when the solenoid 116 is de-energized (not actuated). The user may push the release button 114 such that the protrusion 115 contacts the slider portion 122A. The slider portion 122A then travels a short distance (preferably approximately 5 mm) and is released from below lock bar 126. The shape of the connecting member 124 allows the slider portion 122A to shift when it is contacted by the protrusion 115 of the release button 114 without interference from the connecting member 124 or the solenoid 116.

FIG. 7 illustrates the first embodiment 110A of the buckle assembly when the solenoid 116 is energized (actuated). When solenoid 116 is energized, the solenoid 116 pulls on the connecting member 124. Connecting member 124 is shaped so that the connecting member 124 pulls the slider portion 122A when the solenoid 116 is actuated. The slider portion 122A is pulled such that it is released from below lock bar 126. The slider/latch bar 122 may then freely pivot to release the latch plate 101 from the buckle assembly 110A.

FIGS. 8-10 illustrate a second embodiment 110B of a buckle assembly. The buckle assembly 110B contains many of the same components as the buckle assembly 110A, such as a release button 114, ejector 128, and buckle frame 130. As in buckle assembly 110A, buckle assembly 110B allows a latch plate 101 to be remotely released while maintaining normal mechanical release functionality. In buckle assembly 110B, a connecting member 224 is coupled to a solenoid 216 and a lock bar 226, such that the solenoid 216 acts on the lock bar 226 through the connecting member 224 when the solenoid 216 is actuated.

When a latch plate 101 is inserted into the buckle assembly 110B, a blocking mechanism secures the latch plate. In FIGS. 8-10, a slider/latch bar 222 in conjunction with lock bar 226 performs this blocking mechanism function. When the latch plate 101 is inserted into the buckle assembly 110B, the slider/latch bar 222 rotates downwards towards the bottom of the buckle frame 130 and simultaneously shifts towards the release button 114. The latch bar portion 222B is inserted into a slot of the latch plate 101 and contacts the bottom of the buckle frame 130 so as to secure the latch plate 101 in the buckle assembly 110B. The slider/latch bar 222 is held in place because the slider portion 222A is wedged underneath the lock bar 226 when the latch plate 101 is inserted into the buckle assemble 110B.

FIG. 9 illustrates the second embodiment 110B of the buckle assembly when the solenoid 216 is de-energized (not actuated). The release button 114 may be used to mechanically release the latch plate 101 from the buckle assembly 210 without use of or interference from the solenoid 216. When the release button 114 is depressed, protrusion 115 of release button 114 contacts the slider portion 222A and applies a force such that the slider portion 222A shifts in position away from the release button 114. The shift in position must be sufficient to translate the slider portion 222A past the edge of the lock bar 226. Once the slider portion 222A is no longer wedged underneath the lock bar 226, the slider/latch bar 222 rotates away from the bottom of the buckle frame 130 such that the downward extension 222D of the latch bar portion 222B no longer secures the latch plate 101 in the buckle assembly 110B. The movement and rotation of the slider/latch bar 222 causes the ejector spring 128 to eject the latch plate 101 out of the buckle assembly 110B.

FIG. 10 illustrates the second embodiment 110B of the buckle assembly when the solenoid 216 is energized (actuated). When solenoid 216 is actuated, the solenoid 216 pushes the connecting member 224. The connecting member 224 is shaped so that the connecting member 224 pushes the lock bar 226 along the lock bar slot 227 towards the release button 114 when the solenoid 216 is actuated. This movement of the lock bar 226 allows the slider portion 222A to become unwedged from the lock bar 226. The slider/latch bar 222 may then shift away from the release button 114 and pivot upwards away from the bottom of the buckle frame 130. This pivoting is configured to thereby cause the ejector 128 to eject the latch plate 101 from the buckle assembly 110B.

In some seat belt and buckle assemblies, the remote release mechanism is incorporated into or onto a buckle mounting stalk or strap. The mass of the disengaging portion in these assemblies is large enough to possibly cause serious injury. In seat belt and buckle assemblies of the embodiments of the invention, the remote release mechanism is incorporated into the buckle assembly such that the mass of the disengaging portion is minimized. Only the latch plate itself need be retracted by the seat belt retractor.

The solenoid buckle concept solves problems related to electrical consumption and heat generation. Because the solenoid is no longer in the mechanical load path, it does not need to be actuated to hold the latch plate in place during normal use, therefore, it requires zero current unless it is being actuated to release the latch plate, and as a result, it produces no heat unless it is being activated.

Another benefit of the solenoid buckle concept, is the amount of current required. By designing the solenoid actuation strategy such that only blocking mechanism component needs to be moved, the force requirement for the solenoid is minimized. This allows the size of the solenoid to be minimized. By minimizing the size of the solenoid, the increase in buckle size is also minimized. This allows the buckle to be packaged in nearly all environments that currently use standard buckles.

By designing the remote release mechanism to be installed without re-tooling the buckle frame or internal buckle components (except for modifying the lock bar or slider, which is formed by a very simple tool), modularity and shared components for base and solenoid buckles is maximized. The buckle assemblies of the embodiments of the invention also include fewer components and have a lower cost of the core components then other seat belt and buckle assemblies incorporating a solenoid.

It is important to note that the construction and arrangement of the seat belt system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A vehicle occupant restraint system, comprising:
   a seat belt webbing connected to a latch plate, wherein the latch plate is configured to be releasably connected to a buckle assembly in order to secure the webbing in a position capable of restraining an occupant;
   wherein the buckle assembly includes:
      a release button;
      a blocking component configured to engage the latch plate in order to connect the latch plate to the buckle assembly, wherein the blocking component is configured to disengage from the latch plate in order to facilitate the release of the latch plate when the release button is depressed;
      a solenoid coupled to a connecting member positioned to engage the blocking component;
      a solenoid actuator electrically connected to the solenoid; and
      wherein when the solenoid actuator actuates the solenoid, the connecting member is configured to move to thereby change the position of the blocking component in order to disengage the blocking component from the latch plate,
      wherein the release button includes a protrusion configured to contact and shift a portion of the blocking component when the release button is depressed,
      wherein the solenoid pulls the connecting member when the solenoid is actuated
      wherein the connecting member is J-shaped or U-shaped, wherein the blocking component has an opening, and
wherein the connecting member and blocking component are coupled such that a portion of the connecting member is inserted in the opening of the blocking component and the connecting member partially contains a portion of the blocking component.

2. The vehicle occupant restraint system of claim 1, wherein the solenoid pulls the connecting member to change the position of the blocking component.

3. A vehicle occupant restraint system, comprising:
a seat belt webbing connected to a latch plate, wherein the latch plate is configured to be releasably connected to a buckle assembly in order to secure the webbing in a position capable of restraining an occupant;
wherein the buckle assembly includes:
a release button;
a blocking component configured to engage the latch plate in order to connect the latch plate to the buckle assembly, wherein the blocking component is configured to disengage from the latch plate in order to facilitate the release of the latch plate when the release button is depressed;
a solenoid coupled to a connecting member positioned to engage the blocking component;
a solenoid actuator electrically connected to the solenoid; and
a lock bar configured to restrain the blocking component when the latch plate is inserted into the buckle assembly,
wherein when the solenoid actuator actuates the solenoid, the connecting member is configured to move to thereby change the position of the blocking component in order to disengage the blocking component from the latch plate.

4. The vehicle occupant restraint system of claim 3, wherein the connecting member is additionally coupled to the lock bar, and wherein when the solenoid actuator actuates the solenoid, the connecting member is configured to change the position of the lock bar, which in turn changes the position of the blocking component in order to disengage the blocking component from the latch plate.

5. The vehicle occupant restraint system of claim 4, wherein the release button includes a protrusion configured to contact and shift the blocking component when the release button is depressed.

6. The vehicle occupant restraint system of claim 5, wherein the solenoid pushes the connecting member when the solenoid is actuated.

7. The vehicle occupant restraint system of claim 6, wherein the connecting member has two brackets, wherein the brackets are connected to opposite sides of the lock bar.

8. The vehicle occupant restraint system of claim 7, wherein the connecting member pushes the lock bar such that the lock bar moves within a lock bar slot, and wherein the movement of the lock bar causes the blocking component to disengage from the latch plate.

9. The motor vehicle of claim 6, wherein when the switch is actuated, an electrical signal is sent directly to the solenoid.

10. A motor vehicle having an occupant restraint system, comprising:
a plurality of seats, wherein the seats are configured to support seat occupants;
a seat belt assembly attached to at least one of the plurality of seats, wherein the seat belt assembly is configured to restrain an occupant, and wherein the seat belt assembly includes:
a seat belt webbing connected to a latch plate and a buckle assembly, wherein the latch plate is configured to be releasably connected to a buckle assembly, and wherein the buckle assembly is configured to include:
a release button;
a blocking component configured to engage the latch plate in order to connect the latch plate to the buckle assembly, wherein the blocking component is configured to disengage from the latch plate in order to facilitate the release of the latch plate when the release button is depressed;
a solenoid coupled to a connecting member positioned to engage the blocking component;
a solenoid actuator electrically connected to the solenoid; and
wherein when the solenoid actuator actuates the solenoid, the connecting member is configured to move to thereby change the position of the blocking component in order to disengage the blocking component from the latch plate,
wherein the solenoid actuator is a switch located near the vehicle drive; and
a microprocessor in electrical connection with the solenoid, and wherein when the switch is actuated, an electrical signal is sent to a microprocessor.

11. The motor vehicle of claim 10, wherein the connecting member is additionally coupled to a lock bar configured to restrain the blocking component when the latch plate is inserted into the buckle assembly, and wherein when the solenoid actuator actuates the solenoid, the connecting member is configured to change the position of the lock bar, which in turn changes the position of the blocking component in order to disengage the blocking component from the latch plate.

* * * * *